United States Patent
Suzuki et al.

[11] Patent Number: 6,002,911
[45] Date of Patent: Dec. 14, 1999

[54] CLEANING BLADE

[75] Inventors: Satoshi Suzuki, Inuyama; Yasuhito Suzuki, Komaki; Akihiro Maeda, Kani; Kazuhide Tsuda, Ichinomiya; Shiro Miyamori, Komaki, all of Japan

[73] Assignee: Tokai Rubber Industries, Ltd., Komaki, Japan

[21] Appl. No.: 09/233,020

[22] Filed: Jan. 20, 1999

[30] Foreign Application Priority Data

Jan. 22, 1998 [JP] Japan .................................. 10-10672

[51] Int. Cl.$^6$ .......................... G03G 21/10; G03G 21/00; C08G 18/48; C08G 18/42
[52] U.S. Cl. .............................. 399/350; 528/44; 528/76; 528/80; 528/83; 528/85
[58] Field of Search ................. 399/350; 528/44, 528/85, 76, 80, 83

[56] References Cited

U.S. PATENT DOCUMENTS

| | | | |
|---|---|---|---|
| 4,823,161 | 4/1989 | Yamada et al. | 399/350 |
| 5,157,098 | 10/1992 | Lindblad et al. | 528/60 |
| 5,510,887 | 4/1996 | Watabe et al. | 355/299 |

*Primary Examiner*—Rabon Sergent
*Attorney, Agent, or Firm*—Armstrong, Westerman, Hattori, McLeland & Naughton

[57] ABSTRACT

A cleaning blade (11) is formed of a cured urethane composition of a polyisocyanate and a polyol. The cured composition has a crosslinking density of $8.5\times10^{-4}$ to $11.0\times10^{-4}$ mol/cm$^3$ and a tan δ peak temperature of not greater than 10° C.

2 Claims, 1 Drawing Sheet

CLEANING BLADE

FIELD OF THE INVENTION

The present invention relates to a cleaning blade for removing toner remaining on a peripheral surface of a photosensitive drum of an electrophotographic printer and the like.

BACKGROUND OF THE INVENTION

An electrophotographic printer has a photosensitive drum with a photoconductive surface layer. In operation, a peripheral surface of the photosensitive drum is uniformly charged, the peripheral surface is exposed through an image of a subject to be copied so as to form an electrostatic latent image thereon, the toner is deposited on the electrostatic latent image for formation of a toner image, and the toner image is copied on a sheet of paper and the like. As shown in FIG. 2, since a toner 2 remains on a peripheral surface of a photosensitive drum 1 after copying, the toner 2 is removed by bringing a distal edge of an elastic cleaning blade 3 into sliding contact with the peripheral surface of the photosensitive drum 1. In the Figure, the cleaning blade 3 is supported by a holding plate 4, and one end of the holding plate 4 (the opposite end to the cleaning blade 3) is fixed on a resin case 5.

The service life of the cleaning blade 3 is determined by physical factors such as abrasion loss and damage through sliding contact, and chemical factors such as stain resistance against toner. A urethane rubber is generally used for formation of the cleaning blade due to its excellent properties against these factors. However, use of the cleaning blade formed of the urethane rubber for a long time causes an remarkable presence of time-course abrasion loss. Therefore, fog (toner is scattered in a non-image portion on a paper sheet), white spot, or the like occur. Accordingly, there have been attempts to enhance the wear resistance of the cleaning blade, such as a method for enhancement of hardness of urethane rubber which is disclosed in Japanese Patent Provisional Publication No. 2-208687.

The cleaning blade obtained according to the above method shows a better effect to some extent, however, the cleaning blade is so hard that it causes damage to the photosensitive drum. In order to enhance the wear resistance, the following methods have been proposed; ① dispersing a lubricant in urethane rubber (Japanese Patent Provisional Publication No. 7-306616), ② silicone-modifying urethane rubber (Japanese Patent Provisional publication No.5-224573), ③ providing a coating on a surface of a cured urethane rubber (Japanese Patent Provisional Publication No.4-260084), and ④ breaking the regularity(crystallinity) of a soft segment of the blade (Japanese Patent Provisional Publication No.8-44264). However, in methods ① to ③, an additional process such as adding a lubricant is required, and in the method ④, the liquid composition for formation of the cleaning blade has a high viscosity, thereby deteriorating processability. In all the above methods, production costs will increase.

On the other hand, a good image forming characteristic is required under an environment of a low temperature as well as ordinary temperature, so that reliability for the electrophotographic printer is enhanced. Thus, it is important that the cleaning blade has a good low temperature cleaning performance.

SUMMARY OF THE INVENTION

In view of the foregoing, it is an object of the present invention to provide a cleaning blade which has a good wear resistance and good low temperature cleaning performance.

In accordance with the present invention, there is provided a cleaning blade formed of a cured urethane composition containing a polyisocyanate and a polyol, wherein the cured composition satisfies the following requirements, (A) and (B):

(A) the cured composition has a crosslinking density of $8.5 \times 10^{-4}$ to $11.0 \times 10^{-4}$ mol/cm$^3$ (B) the cured composition has a tan δ peak temperature of not greater than 10° C.

As a result of intensive studies to obtain a cleaning blade having a good wear resistance and good low temperature cleaning performance, the inventors of the present invention have found that wear resistance depends on the molecular structure of the cured composition. The molecular structure of the cured composition is determined by a urethane linear chain and a urethane branched bond such as an allophanate bond. Therefore, it has been found that as the urethane branched bond increases, the crosslinking density of the cured composition becomes higher, resulting in a better wear resistance. Further, crosslinking density which is too high imparts so much hardness to the cured composition as to cause a damage on a photosensitive drum, and it cannot be adapted for practical use. Based upon the above findings, the inventors found a proper range of the crosslinking density for a cleaning blade with an improved wear resistance. However, after trials, the inventors found that even a cleaning blade having an proper range of crosslinking density showed an inferior cleaning performance during operation at a low temperature. As a result of further studies to obtain a cleaning blade having a good wear resistance as well as good low temperature cleaning performance, the inventors attained the invention to accomplish the aforesaid objects by setting respective specific ranges of the crosslinking density and the tan δ peak temperature. It has not yet been made clear why the specific range of the tan δ peak temperature imparts a better low temperature cleaning performance, however, a possible reason is as follows. It is a general trend that when a cured urethane composition is exposed to an environment of a not greater than tan δ peak temperature, it will have more hardness. Especially, the trend is remarkable where the crosslinking density of the cured composition is high. Thus, a permanent set is frequently generated under a low temperature environment, thereby resulting in deterioration in cleaning performance.

The inventors have found a preferable range of the tan δ peak temperature for cleaning blade properties, particularly for the low temperature cleaning performance, wherein the tan δ peak temperature is in the range of 1.0 to 10° C.

DETAILED DESCRIPTION OF THE PREFERRED EMBODIMENTS

The present invention will hereinafter be described in detail by way of various embodiments thereof.

Figure 1:
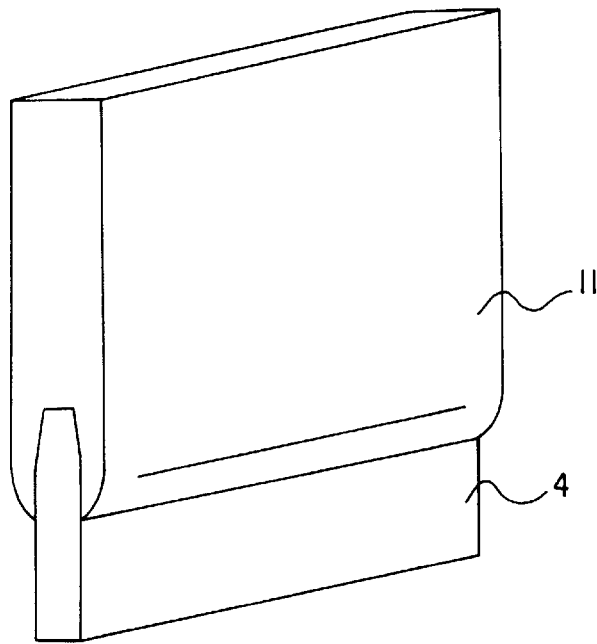
FIG. 1 is a schematic illustration of a cleaning blade of the present invention.

FIG. 1 shows one embodiment wherein a cleaning blade 11 of the present invention is supported by a holding plate 4.

Usable as a material for forming the cleaning blade 11 is a urethane composition containing polyisocyanate and polyol.

The polyisocyanate is not particularly limited, but examples thereof include diisocyanates such as 4,4'-diphenylmethane diisocyanate(MDI), 2,4-tolylene diisocyanate(2,4-TDI), 2,6-tolylene diisocyanate(2,6-TDI), 3,3'-bi-tolylene-4,4'-diisocyanate, 3,3-dimethyl diphenylmethane-4,4'-diisocyanate, 2,4-tolylene diisocyanate uretdion(dimerized2,4-TDI), 1,5-naphthylene diisocyanate, methaphenylene diisocyanate, hexamethylene diisocyanate, isophorone diisocyanate, 4,4'-dicyclohexylmethane diisocyanate (hydrogenated MDI), carbodiimide modified MDI, ortho-toluidine diisocyanate, xylene diisocyanate, para-phenylene diisocyanate and lysine diisocyanate methyl ester, triisocyanates such as triphenylmethane-4,4',4"-triisocyanate, and polymeric MDI, among which MDI is preferable. These may be used either alone or in combination.

Examples of the polyol used along with the polyisocyanate include polyester polyols such as polyester diol and polyester triol, polyether polyols such as polyoxytetramethylene glycol and polyoxypropylene glycol, polycaprolactone, polycarbonate, and the like. These may be used either alone or in combination. The polyol preferably has a number average molecular weight(hereinafter just abbreviated to Mn) of 1,500 to 3,000, more preferably 1,500 to 2,500. If the Mn of the polyol is less than 500, the cleaning blade 11 formed thereof has an inferior solid state properties. If the Mn is greater than 3,000, the processability is deteriorated. Mn is calculated based on a hydroxyl value (mgKOH/g) of the polyol according to the following formula (1).

$$\text{Polyol molecular weight} = 1000/\text{Hydroxyl value} \times \text{Number of hydroxyl group} \times 56.11 \quad (1)$$

Preferable as the polyester polyol is hydroxyl polyester polyols formed of a polybasic organic acid and a polyol, having hydroxyl groups as terminal groups.

The polybasic organic acid is not particularly limited, but a dicarboxylic acid may be used. Examples of the dicarboxylic acid include saturated aliphatic acids such as oxalic acid, butanedioic acid, glutaric acid, adipic acid, pimelic acid, suberic acid, azelaic acid, sebacylic acid and isosebacic acid, unsaturated aliphatic acids such as maleic acid arid fumaric acid, and aromatic acids such as phthalic acid, isophthalic acid and terephthalic acid. Other examples of the polybasic organic acid include acid anhydrides such as maleic unhydride and phthalic anhydride, and dialkyl esters such as dimethyl terephthalate. Further, dimer acids obtained by dimerization of unsaturated aliphatic acids may be used. These may be used either alone or in combination.

The polyol used along with the polybasic organic acid is not particularly limited, but examples thereof include diols such as ethylene glycol, diethylene glycol, triethylene glycol, propylene glycol, dipropylene glycol, butylene glycol, neopentyl glycol, and 1,6-hexylene glycol, triols such as trimethylolethane, trimethylolpropane, hexanetriol, glycerin, and hexaols such as sorbitol. These may be used either alone or in combination.

The polyether polyol is preferably obtained by ring opening polymerization or copolymerization of cyclic ethers.

The cyclic ether is not particularly limited, but examples thereof include ethylene oxide, propylene oxide, trimethylene oxide, butylene oxide, α-methyl trimethylene oxide, 3,3'-dimethyl trimethylene oxide, tetrahydrofuran dioxane and dioxamine.

In the present invention, polybutylene adipate (PBA), polyhexylene adipate (PHA) and polyhexamethylene carbonate (PHC) are preferable among the above-mentioned as the polyol used along with the polyisocyanate. PHC is preferably used in combination with PBA and/or PHA.

In addition to the polyisocyanate and the polyol mentioned above, a chain extender, a foaming agent, a surfactant, a flame-retardant agent, a coloring agent, a filler, a plasticizer, a stabilizer, a mold release agent and a catalyzer may optionally be added to the urethane composition of the invention.

The chain extender is not particularly limited, as long as it is known in the field. Examples thereof include polyols with a molecular weight of less than 300 such as 1,4-butanediol (1,4-BD), ethylene glycol, diethylene glycol, propylene glycol, dipropylene glycol, hexanediol, 1,4-cyclohexanediol, 1,4-cyclohexane dimethanol, xylene glycol, triethylene glycol, trimethylolpropane (TMP), glycerin, pentaerythritol, sorbitol and 1,2,6-hexanetriol. These may be used either alone or in combination.

Usable as the catalyzer are amine compounds such as tertiary amines and organometallic compounds such as organotin compounds, among which amine compounds are preferable.

Examples of the tertiary amines include trialkyl amines such as triethylamine, tetraalkyl diamines such as N,N,N', N'-tetramethyl-1,3-butanediamine, aminoalcohols such as dimethylethanolamine, ester amines such as ethoxylated amine, ethoxylated diamine and bis (diethyl ethanolamine) adipate, cyclohexylamine derivatives such as triethylenediamine and N,N-dimethyl cyclohexylamine, morpholine derivatives such as N-methyl morpholine and N-(2-hydroxypropyl)-dimethyl morpholine, piperazine derivatives such as N,N'-diethyl-2-methyl piperazine and N,N'-bis-(2-hydroxypropyl)-2-methyl piperazine.

Examples of the organotin compounds include dialkyltin compounds such as dibutyltin dilaurate and dibutyltin di-(2-ethylhexoate). Other examples thereof may include stannous 2-ethylcaproate and stannous oleate.

The cleaning blade 11 of the present invention is formed of the materials mentioned above by ordinary methods such as prepolymer method, semi-one-shot method and one-shot method, among which semi-one-shot method is preferable because of its excellent processability.

In accordance with the semi-one-shot method, the cleaning blade 11 of the present invention can be prepared in the following manner. The polyisocyanate is mixed with the polyol in an appropriate ratio to react therewith under all appropriate condition, thereby to produce a urethane polymer (a main liquid material). The polyol, the chain extender and the catalyzer are blended in an appropriate ratio, and then mixed under an appropriate mixing condition, thereby to produce a liquid curing agent. The main liquid material and the liquid curing agent are mixed in an appropriate ratio, and the resultant mixture is filled into a cleaning blade mold to be reacted for curing. The mold is provided with the holding plate 4. The thus obtained cured composition is removed from the mold and processed into a predetermined shape. Thus, the cleaning blade 11 is obtained which is integral with the holding plate 4 as shown in FIG. 1.

The cured composition obtained for the cleaning blade 11 typically has a crosslinking density of $8.5 \times 10^{-4}$ to $11.0 \times 10^{-4}$ mol/cm$^3$, more preferably $8.8 \times 10$ to $10.5 \times 10^{-4}$ mol/cm$^3$. If the crosslinking density is less than $8.5 \times 10^{-4}$ mol/cm$^3$, a sufficient wearing resistance cannot be obtained. If the crosslinking density is greater than $11.0 \times 10^{-4}$ mol/cm$^3$, the cleaning blade has hardness which is too high or an inferior low temperature cleaning performance. The crosslinking density is measured in the following manner. A sample of the cured urethane composition is cut out of the cleaning blade.

The sample is subjected to Soxhlet extraction by using n-hexane, and to vacuum drying. The thus treated sample having a predetermined dimension is prepared, and then dipped in toluene to thereby be swollen. Then, a compressive stress, a compression ratio, and a ratio of height of the sample between before and after swelling thereof are measured by a thermal mechanical analysis apparatus. The crosslinking density can be calculated by thus measured figures according to the theoretical formula of Flory-Rhener.

The cured composition typically has a tan δ peak temperature of not greater than 10° C., more preferably in the range of 1.0 to 10° C. If the tan δ peak temperature is not less than 10° C., the low temperature cleaning performance is remarkably deteriorated. The tan δ peak temperature is one of the dynamic viscoelasticity properties, and is defined as a temperature at which a tan δ (loss tangent) is maximum among tan δ figures measured by a dynamic viscoelasticity analysis apparatus.

Figure 2:
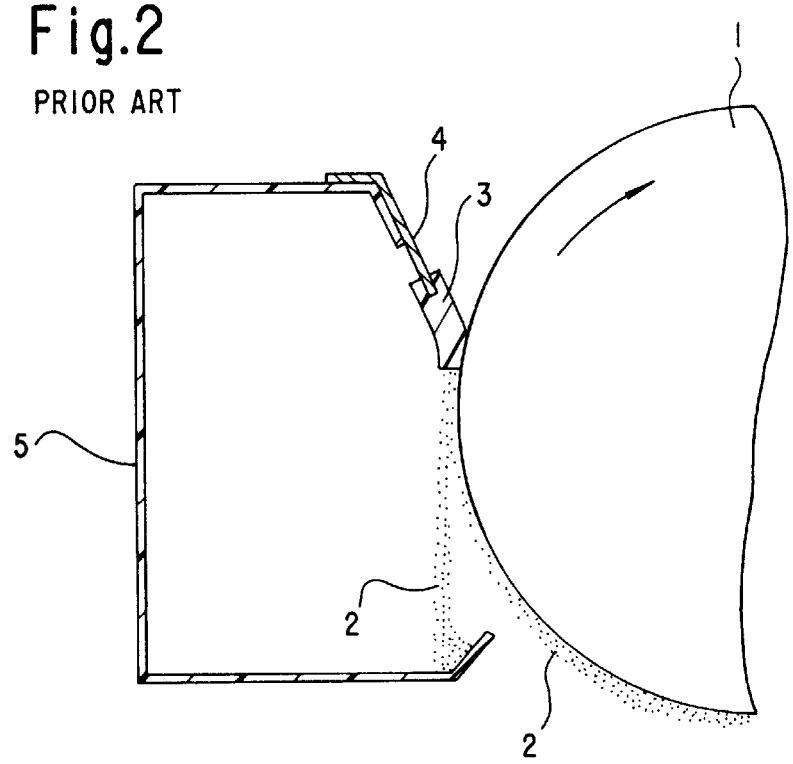
FIG. 2 is a schematic illustration of a part of a cleaning device in a conventional electrophotographic printer.

In view of the foregoing, the cleaning blade 11 has an excellent wear resistance and a superior low temperature cleaning performance because of the specific ranges for the crosslinking density and for the tan δ peak temperature. Further, although the cleaning blade is deformed while cleaning the drum, it restores to its original shape due to the appropriate crosslinking density. Therefore, no permanent set occurs. In the case where the cleaning blade is incorporated for use in an electrophotographic printer having a structure shown in FIG. 2, a defective image such as an image having fog, a white spot or the like is not observed and high image quality can be ensured for a long period over a wide range of temperatures.

Although the FIG. 1 shows one embodiment of the present invention, the cleaning blade 11 is not always integrally formed with the holding plate 4. For example, after being formed, the cleaning blade may be attached to the holding plate 4.

EXAMPLES AND COMPARATIVE EXAMPLES

The present invention will hereinafter be explained by way of Examples and comparative Examples thereof.

Prior to Examples and Comparative Examples, the following main liquid material and liquid curing agent were prepared.

Main Liquid Material

Each material for each main liquid material described in the following Tables 1 to 4 was prepared. First, a polyol was subjected to vacuum defoaming at 80° C. for 1 hour. Then, after a polyisocyanate was mixed with the polyol in the ratio shown in the same Tables, the resultant mixture was placed under a nitrogen atmosphere at 80° C. for 3 hours for reaction. Thus, the main liquid material with NCO terminals was obtained.

Liquid Curing Agent

Each material for each liquid curing agent described in the following Tables 1 to 4 was prepared. First, a polyol was subjected to vacuum defoaming at 80° C. for 1 hour. Then, after the polyol was mixed with other materials in the ratio shown in the same Tables, the resultant mixture was placed under a nitrogen atmosphere at 80° C. so for 1 hour for mixing. Thus, the liquid curing agent with OH terminals was obtained.

TABLE 1

| | (parts by weight) EXAMPLES | | | | |
|---|---|---|---|---|---|
| | 1 | 2 | 3 | 4 | 5 |
| Main liquid material | | | | | |
| polyisocyanate (MDI) polyol | 57.65 | 56.86 | 57.65 | 56.86 | 57.65 |
| PBA (Mn = 2000) | 42.35 | 43.14 | 42.35 | 43.14 | — |
| PHA (Mn = 2000) | — | — | — | — | 42.35 |
| PHC (Mn = 2000) | — | — | — | — | — |
| Liquid curing agent polyol | | | | | |
| PBA (Mn = 2000) | 89.54 | 81.04 | 77.50 | 76.30 | — |
| PHA (Mn = 2000) | — | — | — | — | 88.02 |
| PHC (Mn = 2000) | — | — | — | — | — |
| 1,4-BD | 6.28 | 7.57 | 5.43 | 7.13 | 6.17 |
| TMP | 4.18 | 5.04 | 3.62 | 4.75 | 4.11 |
| catalyzer (ppm/PU)*1 | 300 | 300 | 300 | 300 | 300 |

*1 amine compounds

TABLE 2

| | (parts by weight) EXAMPLES | | | | | |
|---|---|---|---|---|---|---|
| | 6 | 7 | 8 | 9 | 10 | 11 |
| Main liquid material | | | | | | |
| polyisocyanate (MDI) polyol | 56.86 | 57.65 | 56.86 | 52.10 | 52.10 | 57.65 |
| PBA (Mn = 1000) | — | — | — | 38.32 | — | 42.35 |
| PHA (Mn = 2000) | 43.14 | 42.35 | 43.14 | — | 38.32 | — |
| PHC (Mn = 2000) | — | — | — | 9.58 | 9.58 | — |
| Liquid curing agent polyol | | | | | | |
| PBA (Mn = 2000) | — | — | — | 65.24 | — | 96.86 |
| PHA (Mn = 2000) | 79.61 | 76.47 | 54.02 | — | 64.12 | — |
| PHC (Mn = 2000) | — | — | — | 16.31 | 16.03 | — |
| 1,4-BD | 6.96 | 5.36 | 7.01 | 6.44 | 6.33 | 7.36 |
| TMP | 4.64 | 3.57 | 4.67 | 4.29 | 4.22 | 3.96 |
| catalyzer (ppm/PU)*1 | 300 | 300 | 300 | 300 | 300 | 300 |

*1 amine compounds

TABLE 3

| | (parts by weight) COMPARATIVE EXAMPLES | | | | |
|---|---|---|---|---|---|
| | 1 | 2 | 3 | 4 | 5 |
| Main liquid material | | | | | |
| polyisocyanate (MDI) polyol | 56.86 | 51.83 | 57.65 | 56.86 | 56.86 |
| PBA (Mn = 2000) | 43.14 | 48.17 | 42.35 | 43.14 | — |
| PHA (Mn = 2000) | — | — | — | — | 43.14 |

TABLE 3-continued

| | (parts by weight) COMPARATIVE EXAMPLES | | | | |
|---|---|---|---|---|---|
| | 1 | 2 | 3 | 4 | 5 |
| PHC (Mn = 2000) Liquid curing agent polyol | — | — | — | — | — |
| PBA (Mn = 2000) | 83.24 | 84.70 | 72.65 | 73.25 | — |
| PHA (Mn = 2000) | — | — | — | — | 81.77 |
| PHC (Mn = 2000) | — | — | — | — | — |
| 1,4-BD | 7.78 | 6.69 | 5.09 | 6.84 | 7.64 |
| TMP | 5.18 | 4.46 | 3.40 | 4.56 | 5.09 |
| catalyzer (ppm/PU)*1 | 300 | 300 | 300 | 300 | 300 |

*1 amine compounds

TABLE 4

| | (parts by weight) COMPARATIVE EXAMPLES | | | | |
|---|---|---|---|---|---|
| | 6 | 7 | 8 | 9 | 10 |
| Main liquid material | | | | | |
| polyisocyanate (MDI) polyol | 51.83 | 57.65 | 56.86 | 52.10 | 52.10 |
| PBA (Mn = 2000) | — | — | — | 38.32 | — |
| PHA (Mn = 2000) | 48.17 | 42.35 | 43.14 | — | 38.32 |
| PHC (Mn = 2000) Liquid curing agent polyol | — | — | — | 9.58 | 9.58 |
| PBA (Mn = 2000) | — | — | — | 71.46 | — |
| PHA (Mn = 2000) | 83.16 | 71.72 | 72.08 | — | 70.13 |
| PHC (Mn = 2000) | — | — | — | 17.86 | 17.53 |
| 1,4-BD | 6.56 | 5.03 | 6.73 | 7.05 | 6.92 |
| TMP | 4.38 | 3.35 | 4.49 | 4.70 | 4.62 |
| catalyzer (ppm/PU)*1 | 300 | 300 | 300 | 300 | 300 |

*1 amine compounds

Examples 1–11, Compartive Examples 1–10

Each main liquid material was blended with each liquid curing agent in the ratio shown in Tables 1 to 4 at a liquid temperature of 70° C., and mixed together with a stirring blade for 30 seconds while being subjected to vacuum defoaming. Then, the resultant mixture was filled into a cleaning blade mold (kept at 140° C.) provided with the holding plate. After curing, the resultant cured composition with the holding plate were unmolded and formed into a predetermined shape. Thus, the cleaning blade with the holding plate was each obtained.

The crosslinking density, the tan δ peak temperature, Wallace hardness (IRHD), tensile strength and elongation of the thus obtained cleaning blades of Examples 1 through 11 and Comparative Examples 1 through 10 were each measured in the manner discussed below. The results of the measurements are shown in Tables 5 to 8. In addition, the cleaning blade with the holding plate was incorporated into a commercially available laser printer (LBP), and after the first and 30,000th images on A4 size paper were printed under an environment of ordinary temperature and humidity (25° C.×60%RH), the abrasion loss of the cleaning blade was calculated in the way shown below, and the image quality of the thus obtained prints was evaluated in the manner also set forth below. The results of the calculation and evaluation are described together in Tables 5 to 8. In addition, the cleaning blade with the holding plate was incorporated into the above LBP, and after the first and 6,000th images on A4 size paper were printed under an environment of a low temperature and humidity (LL environment: 5° C.×15%RH), the image quality of the thus obtained prints was also evaluated in the manner set forth below, same as above.

Crosslinking Density

First, a sample of the cured urethane composition was cut out of the cleaning blade. The sample was subjected to Soxhlet extraction (80° C.×15 hours) by using n-hexane, and to vacuum drying (room temperature(25° C.)×15 hours). The thus treated sample having a dimension of 2 mm×2 mm×1 mm was prepared, and then dipped in toluene (80° C.×16 hours) to thereby be swollen. Then, a loading speed of −250 g/min was applied to the swollen sample to measure compressive stress, compression ratio, and ratio of height of the sample before and after swelling, by a thermal mechanical analysis apparatus (TMA-50 manufactured by Shimadzu Corporation: room temperature). The crosslinking density was calculated by thus measured data according to the following theoretical formula of Flory-Rhener (2).

$$V = \frac{\tau}{RT(\alpha - 1/\alpha^2)\{(\xi^3 - \phi)/(1 - \phi)\}^{1/3}} \quad (2)$$

wherein V is the crosslinking density, τ is the compressive stress, R is the gas constants T is the absolute temperature when the thermal mechanical analysis apparatus is operated, α is the compression ratio, ξ is the ratio of height of the sample before and after swelling, and ø is the amount of a filler (ø=0 for this case).

tan δ peak temperature

A sample of the cured urethane composition having a dimension of 1.6 mm×1.6 mm×30.0 mm was prepared from the cleaning blade. The sample was set in a DVE Rheospectler (manufactured by Rheology Co.) to have a chuck space of 20.0 mm in a tension jig thereof, and a sine wave with a displacement amplitude of ±10 μm and a frequency of 10 Hz was applied to the sample so as to impart distortion. Then, a tan δ (loss tangent) in the range of −20° C. to 50° C. was measured at every 1° C. increment at a temperature increase rate of 3° C./min. The tan δ peak temperature is defined as a temperature at which a tan δ becomes maximum among these measured tan δ values.

Wallace Hardness

Japanese Industrial Standard JIS K6253 was applied to measure a hardness by using Wallace hardness micrometer manufactured by H. W. WALLACE Co.

Tensile Strength

Japanese Industrial Standard JIS K6301 was applied.

Elongation

Japanese Industrial standard JIS K6301 was applied.

Abrasion Loss

A worn part of a distal edge of the cleaning blade was observed by a scanning electron microscope in order to measure a cross-sectional area ( U μm$^2$) and a unit length (X μm) of the worn part, and the abrasion loss (W μm$^3$) was calculated according to the following formula (3).

$$W = U \times X \quad (3)$$

As the abrasion loss becomes smaller, the cleaning blade has better wear resistance.

Image Quality

The obtained image prints including a character image were visually checked for evaluation of the image quality thereof. In the tables, ○ indicates that there was no problem on images and even a fine line was sharp in the produced image, and X indicates that fog, white spot or the like frequently took place and defects appeared on images.

TABLE 5

| | EXAMPLES | | | | |
|---|---|---|---|---|---|
| | 1 | 2 | 3 | 4 | 5 |
| crosslinking density (mol/cm$^3$) | 10.1 × 10$^{-4}$ | 8.5 × 10$^{-4}$ | 10.8 × 10$^{-4}$ | 9.3 × 10$^{-4}$ | 10.4 × 10$^{-4}$ |
| tan δ peak temp. (° C.) | 6.8 | 8.9 | 9.5 | 10.0 | 6.5 |
| Wallace hardness | 72.0 | 70.3 | 74.2 | 71.1 | 72.5 |
| tensile strength (Mpa) | 35.2 | 36.6 | 34.0 | 32.3 | 31.4 |
| elongation (%) | 240 | 253 | 211 | 249 | 250 |
| practical durability test ordinary temp. and humidity abrasion loss (μm$^3$) | 16 | 21 | 8 | 18 | 19 |
| image quality | | | | | |
| initial | ○ | ○ | ○ | ○ | ○ |
| 30,000th | ○ | ○ | ○ | ○ | ○ |
| LL environment | ○ | ○ | ○ | ○ | ○ |

TABLE 6

| | EXAMPLES | | | | | |
|---|---|---|---|---|---|---|
| | 6 | 7 | 8 | 9 | 10 | 11 |
| crosslinking density (mol/cm$^3$) | 8.6 × 10$^{-4}$ | 11.0 × 10$^{-4}$ | 9.4 × 10$^{-4}$ | 8.9 × 10$^{-4}$ | 9.1 × 10$^{-4}$ | 8.5 × 10$^{-4}$ |
| tan δ peak temp. (° C.) | 8.8 | 9.5 | 9.8 | 9.1 | 8.9 | 1.0 |
| Wallace hardness | 70.2 | 73.9 | 70.7 | 70.3 | 70.9 | 73.2 |
| tensile strength (Mpa) | 39.3 | 30.8 | 37.4 | 30.7 | 29.9 | 33.5 |
| elongation (%) | 258 | 212 | 249 | 257 | 260 | 278 |
| practical durability test ordinary temp. and humidity abrasion loss (μm$^3$) | 24 | 9 | 20 | 20 | 22 | 25 |
| image quality | | | | | | |
| initial | ○ | ○ | ○ | ○ | ○ | ○ |
| 30,000th | ○ | ○ | ○ | ○ | ○ | ○ |
| LL environment | ○ | ○ | ○ | ○ | ○ | ○ |

TABLE 7

| | COMPARATIVE EXAMPLES | | | | |
|---|---|---|---|---|---|
| | 1 | 2 | 3 | 4 | 5 |
| crosslinking density (mol/cm$^3$) | 8.1 × 10$^{-4}$ | 7.7 × 10$^{-4}$ | 11.3 × 10$^{-4}$ | 10.0 × 10$^{-4}$ | 8.3 × 10$^{-4}$ |
| tan δ peak temp. (° C.) | 8.0 | 0.5 | 9.9 | 10.8 | 8.2 |
| Wallace hardness | 69.8 | 69.0 | 75.1 | 71.4 | 69.6 |
| tensile strength (Mpa) | 36.3 | 26.9 | 33.1 | 37.1 | 35.9 |
| elongation (%) | 265 | 295 | 205 | 242 | 271 |
| practical durability test ordinary temp. and humidity abrasion loss (μm$^3$) | 51 | 73 | 6 | 16 | 62 |
| image quality | | | | | |
| initial | ○ | ○ | ○ | ○ | ○ |
| 30,000th | X | X | X | ○ | X |
| LL environment | ○ | ○ | ○ | X | ○ |

TABLE 8

| | COMPARATIVE EXAMPLES | | | | |
|---|---|---|---|---|---|
| | 6 | 7 | 8 | 9 | 10 |
| crosslinking density (mol/cm$^3$) | 8.0 × 10$^{-4}$ | 11.6 × 10$^{-4}$ | 10.1 × 10$^{-4}$ | 7.5 × 10$^{-4}$ | 7.6 × 10$^{-4}$ |
| tan δ peak temp. (° C.) | 0.8 | 9.8 | 11.2 | 3.3 | 4.0 |
| Wallace hardness | 68.9 | 75.8 | 71.0 | 69.8 | 69.2 |
| tensile strength (Mpa) | 30.1 | 38.3 | 31.9 | 40.5 | 38.6 |
| elongation (%) | 308 | 210 | 250 | 310 | 302 |
| practical durability test ordinary temp. and humidity abrasion loss (μm$^3$) | 85 | 9 | 19 | 79 | 92 |
| image quality | | | | | |
| initial | ○ | ○ | ○ | ○ | ○ |
| 30,000th | X | X | ○ | X | X |
| LL environment | ○ | ○ | X | ○ | ○ |

As can be understood from the above results, the cleaning blades of Examples according to the present invention show a smaller abrasion loss due to their excellent wear resistance. Further, the cleaning blades have good low temperature cleaning performance since high image quality was ensured under the low temperature environment. More further, high image quality was provided for a long period over a wide range of temperatures by use of the cleaning blade. According to the above results, both the first and 30,000th image prints have high quality. In the meantime, the Wallace hardness, tensile strength and elongation of the Examples fall within the proper range, and therefore it is appreciated that all the Examples have properties required as a cleaning blade. To the contrary, the blades of the Comparative Examples have an inferior wear resistance or low temperature cleaning performance. Thus, it is understood that even if a good image quality can be obtained at the initial stage, the same image quality cannot be ensured for a long period over a wide range of temperatures.

EFFECTS OF THE INVENTION

The cleaning blade of the present invention has an excellent wear resistance and low temperature cleaning performance, because it comprises the cured composition having a specific range for the crosslinking density and for the tan δ peak temperature. Therefore, in the case where an image is obtained by an electrophotographic printer having the cleaning blade incorporated therein, it is advantageous that high image quality can be ensured for a long period over a wide range of temperatures.

It is preferable that the tan δ peak temperature is in the range of 1.0 to 10° C. for a good low temperature cleaning performance.

What is claimed is:

1. A cleaning blade comprising a cured urethane composition of a polyisocyanate and a polyol, wherein the cured urethane composition satisfies the following requirements, (A) and (B):

(A) the cured composition has a crosslinking density of $8.5 \times 10^{-4}$ to $11.0 \times 10^{-4}$ mol/cm$^3$ (B) the cured composition has a tan δ peak temperature of not greater than 10° C.

2. A cleaning blade according to claim 1, wherein the tan δ peak temperature is in the range of 1.0 to 10° C.

* * * * *